(12) United States Patent
Wang (10) Patent No.: US 11,966,074 B2
(45) Date of Patent: Apr. 23, 2024

(54) METAL BACK PLATE AND MANUFACTURING PROCESS THEREOF, BACKLIGHT MODULE AND ELECTRONIC DEVICE

(71) Applicant: BEIJING XIAOMI MOBILE SOFTWARE CO., LTD., Beijing (CN)

(72) Inventor: Zheng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 139 days.

(21) Appl. No.: 17/334,429

(22) Filed: May 28, 2021

(65) Prior Publication Data

US 2022/0099881 A1 Mar. 31, 2022

(30) Foreign Application Priority Data

Sep. 29, 2020 (CN) .......................... 202011050675.9

(51) Int. Cl.
*F21V 8/00* (2006.01)
*B23P 15/00* (2006.01)
*C21D 8/02* (2006.01)
*C22F 1/047* (2006.01)

(52) U.S. Cl.
CPC ............ *G02B 6/0081* (2013.01); *B23P 15/00* (2013.01); *C21D 8/02* (2013.01); *C22F 1/047* (2013.01)

(58) Field of Classification Search
CPC .. G02B 6/0081; G02B 6/0055; G02B 6/0011; B23P 15/00; C21D 8/02; C21D 8/0294; C21D 9/46; C21D 2221/00; C21D 2261/00; C22F 1/047; H04M 1/0264; H04M 1/22; C22C 21/06; C22C 21/00; C22C 21/08; G06F 1/1626; G06F 1/1656; G06F 1/1686

See application file for complete search history.

(56) References Cited

U.S. PATENT DOCUMENTS

| 2018/0255652 A1* | 9/2018 | Zhang | G06F 1/1613 |
| 2019/0361169 A1* | 11/2019 | Isono | G02B 6/0055 |
| 2022/0095467 A1* | 3/2022 | Jou | C22F 1/00 |

FOREIGN PATENT DOCUMENTS

| CN | 1639214 A | 7/2005 |
| CN | 107009698 A | 8/2017 |
| CN | 110396633 A | 11/2019 |
| EP | 3227111 A1 | 10/2017 |

OTHER PUBLICATIONS

European Patent Application No. 21176642.3 extended Search and Opinion dated Nov. 11, 2021, 11 pages.
Chinese Patent Application No. 202011050675.9, Office Action dated Aug. 10, 2023, 6 pages.
Chinese Patent Application No. 202011050675.9, English translation of Office Action dated Aug. 10, 2023, 12 pages.

* cited by examiner

*Primary Examiner* — John A Hevey
(74) *Attorney, Agent, or Firm* — COZEN O'CONNOR (57) ABSTRACT

The present disclosure provides a metal back plate and a manufacturing process thereof, a backlight module and an electronic device. The metal back plate is used for the backlight module. The metal back plate includes a first area and a second area. The grain size of the metal material in the first area is larger than the grain size of the metal material in the second area. The first area is formed with a first opening.

18 Claims, 6 Drawing Sheets

METAL BACK PLATE AND MANUFACTURING PROCESS THEREOF, BACKLIGHT MODULE AND ELECTRONIC DEVICE

CROSS-REFERENCE TO RELATED APPLICATIONS

This application claims a priority to Chinese Patent Application No. 202011050675.9, filed on Sep. 29, 2020, the entire content of which is incorporated herein by reference for all purposes.

TECHNICAL FIELD

The present disclosure generally relates to a field of an electronic device, and more particularly to a metal back plate and a manufacturing process thereof, a backlight module and an electronic device.

BACKGROUND

With the rapid development of electronic devices, high-capacity batteries and high-integrated electronic devices have become more popular. By increasing the weight of the battery cells, the batteries may have a larger capacity, but this makes the weight of the electronic devices larger, which is not conducive to improving the comfort of the user. To reduce the weight of the electronic devices, the material of the metal back plate for the backlight module may be adjusted. For example, the original stainless steel material of the metal back plate may be replaced by an O-state aluminum-magnesium alloy with a lower density. However, the metal back plate made of the O-state aluminum-magnesium alloy is prone to appearance defects such as warpage.

SUMMARY

According to a first aspect of embodiments of the present disclosure, there is provided a metal back plate for a backlight module. The metal back plate includes a first area and a second area, grain size of a first metal material in the first area is larger than grain size of a second metal material in the second area, and the first area is formed with a first opening.

According to a second aspect of embodiments of the present disclosure, there is provided a process for manufacturing the metal back plate as described in any embodiment hereinbefore, including:
  obtaining a metal substrate including a first section and a second section;
  placing the second section in annealing equipment to perform a first annealing treatment, while the first section remains outside the annealing equipment; and
  performing a cutting and punching treatment on the metal substrate after the first annealing treatment, such that at least part of the second section forms the second area of the metal back plate, at least part of the first section is used as the first area of the metal back plate, and a first opening is formed in the first area to obtain the metal back plate.

According to a third aspect of embodiments of the present disclosure, there is provided a backlight module including:
  a backlight layer including a light-emitting surface and a back surface opposite to the light-emitting surface, in which the backlight layer is formed with a second opening; and
  the metal back plate as described in any embodiment hereinbefore, arranged on a back side of the backlight layer, the first opening and the second opening being coaxial.

According to a fourth aspect of embodiments of the present disclosure, there is provided an electronic device, including:
  a display layer including a display surface and a back surface opposite to the display surface;
  the backlight module as described in any embodiment hereinbefore, disposed on the back surface of the display layer, the light-emitting surface of the backlight layer in the backlight module facing the back surface of the display layer; and
  a camera module arranged on a side of the backlight module away from the display layer, the camera module being opposite to the first opening of the metal back plate.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used in the present disclosure are merely for the purpose of describing particular embodiments and are not intended to limit the present disclosure. Unless defined otherwise herein, all the technical and scientific terms used herein have the same meaning as commonly understood by one of ordinary skill in the art to which the present disclosure belongs. The terms such as "first", "second" and the like used in the specification and claims of the present disclosure are not intended to indicate or imply relative importance or significance or to imply the order or number of indicated technical features, but are only used to distinguish different components. Similarly, terms like "a", "an" or "one" do not denote a quantity limit, but mean that there is at least one. It will be further understood that the terms "comprise(s)," "comprising," "include(s)," and/or "including" when used herein specify the presence of stated features, integers, steps, operations, elements, and/or components, but do not preclude the presence or addition of one or more other features, integers, steps, operations, elements, components, and/or groups thereof. In the present disclosure, unless specified or limited otherwise, the terms "connected" or "coupled" and the like are not limited to physical or mechanical connections, and may also include electrical connections, either direct or indirect.

The singular forms of "a", "an", "the" and "said" used in the specification of the present disclosure and the appended claims are intended to include plural forms as well, unless the context clearly indicates otherwise. It should also be understood that the term "and/or" represents and contains any one and all possible combinations of one or more associated listed items.

In the related art, the electronic devices include a display layer and a backlight module, and the backlight module is arranged on the back surface of the display layer. The backlight module includes a backlight layer and a metal back plate, and the metal back plate is arranged on the back surface of the backlight layer. The metal back plate is formed with a first opening. By replacing SUS304 stainless steel with an O-state aluminum-magnesium alloy to make the metal back plate, the weight of the metal back plate may be reduced. For example, the mass of a metal back plate made of an aluminum-magnesium alloy with a density of 2.63 g/cm³ may be reduced by 6 g as compared with a same size metal back plate made of SUS304 stainless steel. However, the hardness of the O-state aluminum-magnesium alloy is between 70 to 80 HV, and the appearance defects such as deformation, warpage and scratches are prone to occur during the manufacturing process of the metal back plate, which reduces the manufacturing yield of the metal back plate.

If an H38-state aluminum-magnesium alloy is used to substitute for the SUS304 stainless steel to make the metal back plate, the weight of the metal back plate may also be reduced. However, the elongation of the H38-state aluminum-magnesium alloy is lower, and cracks are prone to occur at the position of the first opening, which is also not conducive to the manufacturing yield of the metal back plate.

In order to solve the above-mentioned problems, embodiments of the present disclosure provide a metal back plate and a manufacturing process thereof, a backlight module and an electronic device, which are described in detail below with reference to the accompanying drawings.

According to a first aspect of embodiments of the present disclosure, there is provided a metal back plate for a backlight module. The metal back plate includes a first area and a second area, grain size of a first metal material in the first area is larger than grain size of a second metal material in the second area, and the first area is formed with a first opening.

Alternatively, the first metal material in the first area and the second metal material in the second area are identical.

Alternatively, both the first metal material in the first area and the second metal material in the second area include an aluminum-magnesium alloy.

Alternatively, the aluminum-magnesium alloy in the first area includes an O-state aluminum-magnesium alloy, and the aluminum-magnesium alloy in the second area includes an H38-state aluminum-magnesium alloy.

Alternatively, the first area is connected to the second area.

According to a second aspect of embodiments of the present disclosure, there is provided a process for manufacturing the metal back plate as described in any embodiment hereinbefore, including:
  obtaining a metal substrate including a first section and a second section;
  placing the second section in annealing equipment to perform a first annealing treatment, while the first section remains outside the annealing equipment; and
  performing a cutting and punching treatment on the metal substrate after the first annealing treatment, such that at least part of the second section forms the second area of the metal back plate, at least part of the first section is used as the first area of the metal back plate, and a first opening is formed in the first area to obtain the metal back plate.

Alternatively, the annealing equipment includes a salt bath furnace containing potassium nitrate or molten lead at a temperature between 350° C. and 550° C.

Alternatively, the first annealing treatment is performed for 2 s to 180 s.

Alternatively, obtaining the metal substrate includes:
  obtaining an aluminum-magnesium alloy plate; and
  performing a hot rolling treatment, a first cold rolling treatment, a second annealing treatment, a second cold rolling treatment, a third annealing treatment, a third cold rolling treatment, a straightening and trimming treatment and a cleaning treatment sequentially on the aluminum-magnesium alloy plate to obtain the metal substrate.

According to a third aspect of embodiments of the present disclosure, there is provided a backlight module including:
  a backlight layer including a light-emitting surface and a back surface opposite to the light-emitting surface, in which the backlight layer is formed with a second opening; and
  the metal back plate as described in any embodiment hereinbefore, arranged on a back side of the backlight layer, the first opening and the second opening being coaxial.

According to a fourth aspect of embodiments of the present disclosure, there is provided an electronic device, including:
  a display layer including a display surface and a back surface opposite to the display surface;
  the backlight module as described in any embodiment hereinbefore, disposed on the back surface of the display layer, the light-emitting surface of the backlight layer in the backlight module facing the back surface of the display layer; and
  a camera module arranged on a side of the backlight module away from the display layer, the camera module being opposite to the first opening of the metal back plate.

The technical solutions provided by the present disclosure may at least have advantages as follows.

In the metal back plate provided by the embodiments of the present disclosure, the grain size of the first metal material in the first area is larger than the grain size of the second metal material in the second area, which makes the elongation of the first area greater than that of the second area, thereby making the first opening of the first area less prone to cracks. Moreover, the smaller grain size of the second metal material in the second area than the first metal material in the first area makes the hardness and mechanical strength of the second area greater than that of the first area, thereby making the deformation, warpage, scratches and other appearance defects not occur during the manufacturing and assembly process of the metal back plate. The cooperation of the first area and the second area is beneficial to the improvement of the production yield of the metal back plate, the backlight module and the electronic device.

The electronic devices provided by the embodiments of the present disclosure include, but are not limited to, mobile phones, tablet computers, iPads, digital broadcast terminals, messaging devices, game consoles, medical equipment, fitness equipment, personal digital assistants, smart wearable devices, and smart TV, etc.

Figure 1:
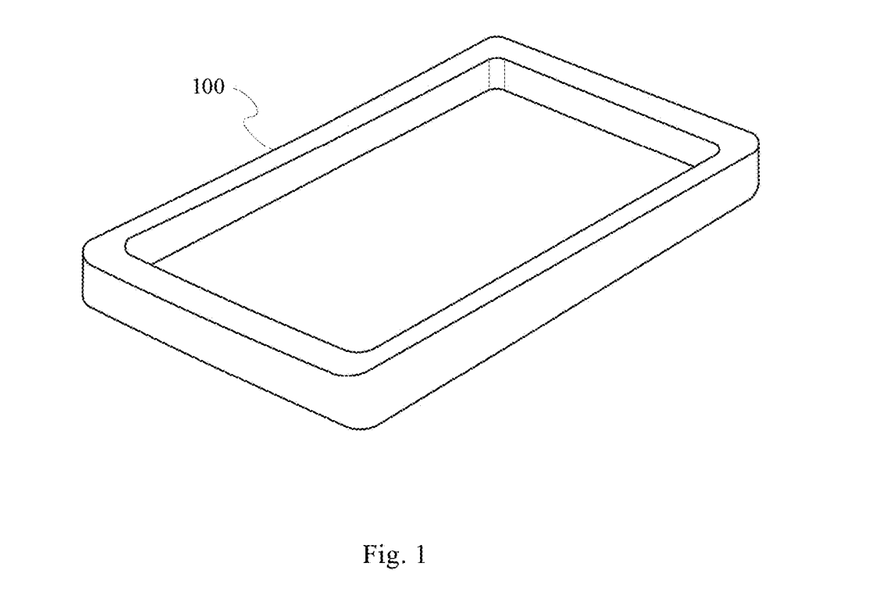
FIG. 1 is a schematic diagram of an electronic device according to an exemplary embodiment of the present disclosure.
Figure 2:
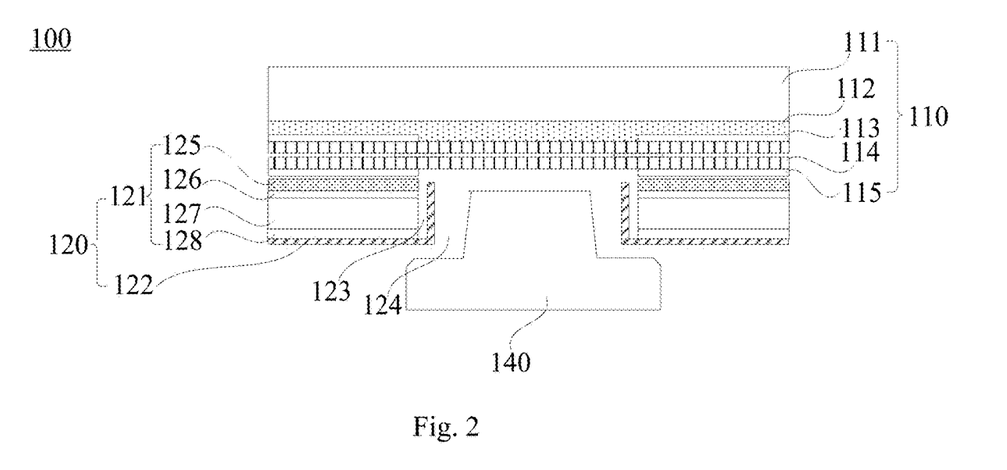
FIG. 2 is a partial cross-sectional view of an electronic device according to an exemplary embodiment of the present disclosure.

FIG. 1 is a schematic diagram of an electronic device according to an exemplary embodiment of the present disclosure. FIG. 2 is a partial cross-sectional view of an electronic device according to an exemplary embodiment of the present disclosure. With reference to FIG. 1 and FIG. 2, the electronic device 100 includes a display layer 110, a backlight module 120 and a camera module 140.

The display layer 110 includes a display surface and a back surface opposite to the display surface, and the display surface is configured to display digits or images. Exemplarily, referring to FIG. 2, the display layer 110 may include a glass cover 111, an optical adhesive layer 112, an upper polarizer 113, a liquid crystal layer 114 and a lower polarizer 115 that are sequentially stacked.

The backlight module 120 is disposed on the back surface of the display layer 110, and a light-emitting surface of the backlight layer 121 of the backlight module 120 faces the back surface of the display layer 110. The backlight module 120 is configured to provide a backlight source for the display layer 110. The backlight module 120 includes a backlight layer 121 and a metal back plate 122. The backlight layer 121 includes the light-emitting surface and a back surface opposite to the light-emitting surface, and the backlight layer 121 is formed with a second opening 123. The metal back plate 122 is disposed on a back side of the backlight layer 121, and a first opening 124 of the metal back plate 122 is coaxial with the second opening 123. Exemplarily, the backlight layer 121 includes a prism layer 125, a diffusion layer 126, a light guide plate 127, a reflective layer 128, and the metal back plate 122 that are sequentially stacked. The prism layer 125 is close to the back surface of the display layer 110 relative to the metal back plate 122. Exemplarily, the aperture size of the first opening 124 is equal to that of the second opening 123. Exemplarily, with reference to FIG. 2, the aperture size of the first opening 124 is smaller than that of the second opening 123, and the first opening 124 is sleeved in the second opening 123.

The camera module 140 is disposed on a side of the backlight module 120 away from the display layer 110, and the camera module 140 is opposite to the first opening 124 of the metal back plate 122. Exemplarily, at least part of the camera module 140 extends into the first opening 124. Understandably, the camera module 140 is a front camera module.

Figure 3:
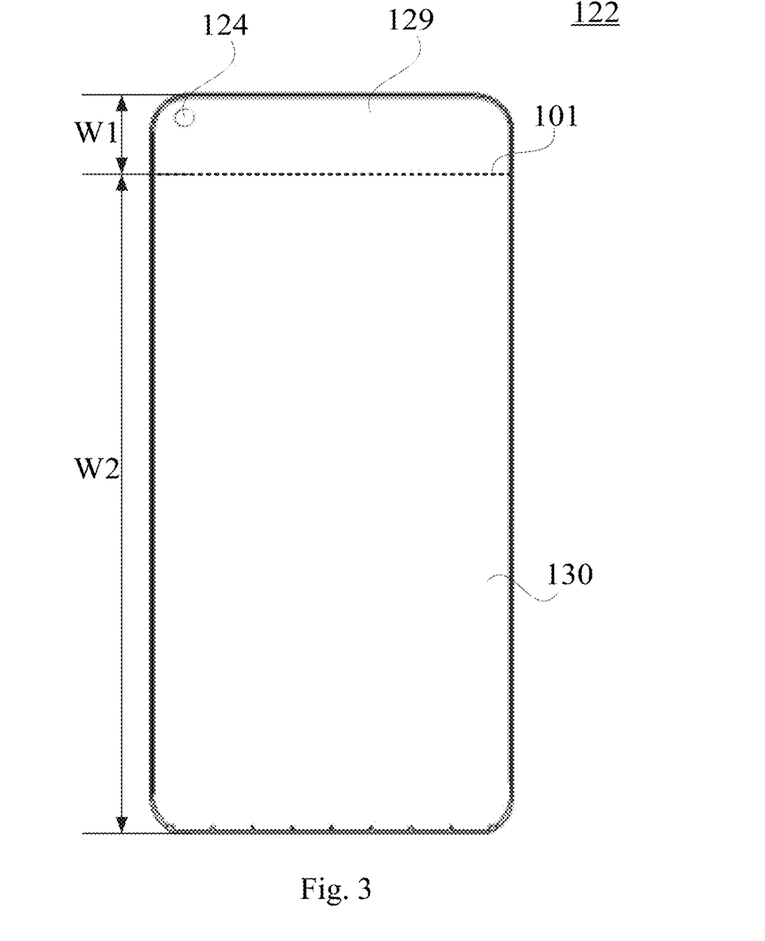
FIG. 3 is a schematic diagram of a metal back plate according to an exemplary embodiment of the present disclosure.

FIG. 3 is a schematic diagram of a metal back plate 122 according to an exemplary embodiment of the present disclosure. The metal back plate 122 provided by the embodiments of the present disclosure may be used for the backlight module 120. With reference to FIG. 3, the metal back plate 122 includes a first area 129 and a second area 130. The grain size of a first metal material in the first area 129 is larger than the grain size of a second metal material in the second area 130, and the first area 129 is formed with a first opening 124. Based on the Hall-Petch formula, the grain size of metal materials is negatively related to the mechanical strength and hardness, the larger the grain size, the smaller the mechanical strength and hardness, and the smaller the grain size, the greater the mechanical strength and hardness. Moreover, the larger the grain size, the greater the elongation, and the smaller the grain size, the smaller the elongation. Since the grain size of the first metal material in the first area 129 is larger than the grain size of the second metal material in the second area 130, the elongation of the first area 129 is greater than the elongation of the second area 130, and the mechanical strength and hardness of the second area 130 are greater than the mechanical strength and hardness of the first area 129.

based on the above description, in the metal back plate 122 provided by the embodiments of the present disclosure, the grain size of the first metal material in the first area 129 is larger than the grain size of the second metal material in the second area 130, which makes the elongation of the first area 129 greater than that of the second area 130, thereby making the first opening 124 of the first area 129 less prone to cracks. Moreover, the smaller grain size of the second metal material in the second area 130 than the first metal material in the first area 129 makes the hardness and mechanical strength of the second area 130 greater than that of the first area 129, thereby making the deformation, warpage, scratches and other appearance defects not occur during the manufacturing and assembly process of the metal back plate 122. The cooperation of the first area 129 and the second area 130 is beneficial to the improvement of the production yield of the metal back plate 122, the backlight module 120 and the electronic device 100.

In some embodiments, the first metal material in the first area 129 and the second metal material in the second area 130 are identical. In this way, the first area 129 and the second area 130 may be formed by the same metal substrate by adjusting the process, which is beneficial to the reduction of the production cost.

In some embodiments, both the first metal material in the first area 129 and the second metal material in the second area 130 include an aluminum-magnesium alloy. As compared to the SUS304 stainless steel, the aluminum-magnesium alloy has a lower density, which is beneficial to the reduction of the weight of the metal back plate 122, thereby reducing the weight of the backlight module 120 and the electronic device 100. Exemplarily, the density of the aluminum-magnesium alloy ranges from 2.5 to 2.7 g/cm$^3$, such as 2.5 g/cm$^3$, 2.6 g/cm$^3$, 2.63 g/cm$^3$, or 2.7 g/cm$^3$.

Figure 4:
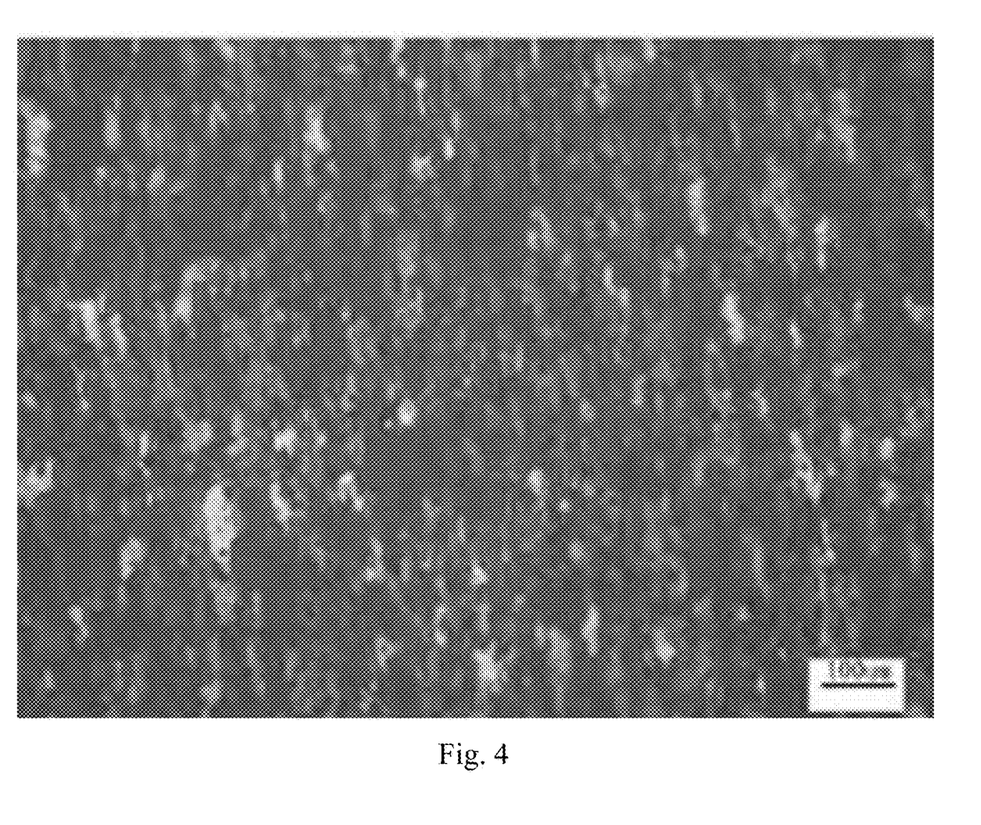
FIG. 4 is a metallographic micro-morphology diagram of an O-state aluminum-magnesium alloy according to an exemplary embodiment of the present disclosure.
Figure 5:
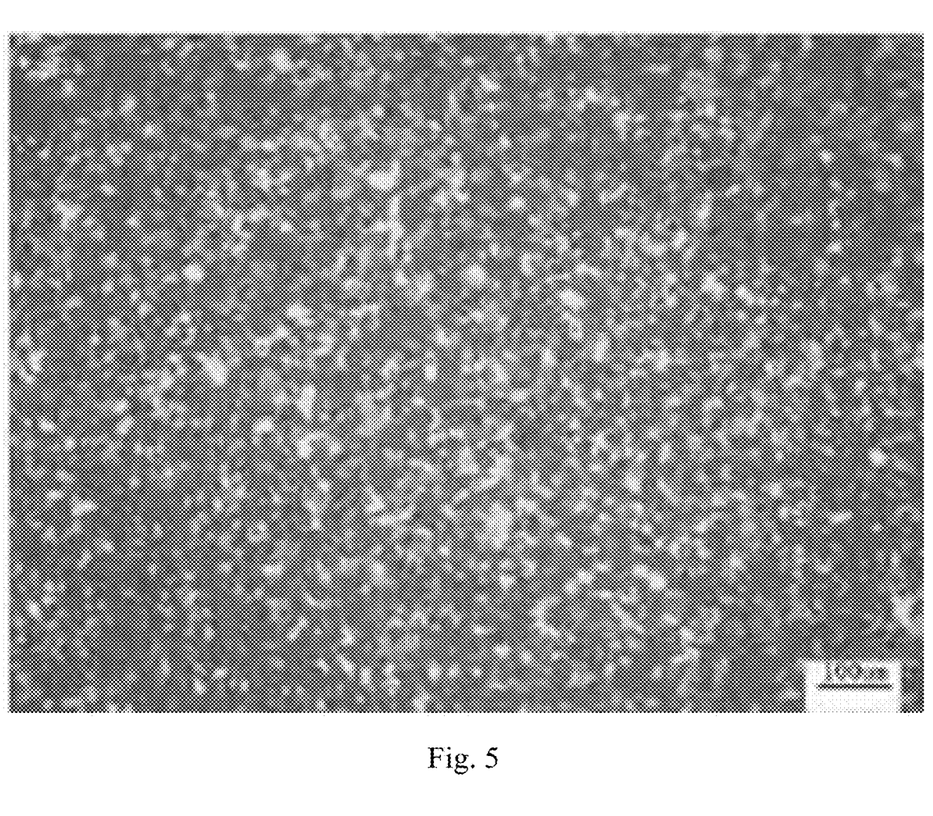
FIG. 5 is a metallographic micro-morphology diagram of an H38-state aluminum-magnesium alloy according to an exemplary embodiment of the present disclosure.

In some embodiments, the aluminum-magnesium alloy in the first area 129 includes an O-state aluminum-magnesium alloy, and the aluminum-magnesium alloy in the second area 130 includes an H38-state aluminum-magnesium alloy. The mechanical strength, hardness and elongation of the O-state aluminum-magnesium alloy and the H38-state aluminum-magnesium alloy may well meet the manufacturing requirements of the metal back plate 122. FIG. 4 shows a metallographic micro-morphology diagram of an O-state aluminum-magnesium alloy according to an exemplary embodiment of the present disclosure, FIG. 5 shows a metallographic micro-morphology diagram of an H38-state aluminum-magnesium alloy according to an exemplary embodiment of the present disclosure, and the metallographic micro-morphology diagrams shown in FIG. 4 and FIG. 5 are obtained at the same resolution. With reference to FIG. 4 and FIG. 5, the grain size of the O-state aluminum-magnesium alloy is larger than that of the H38-state aluminum-magnesium alloy. The specific performance parameters of the O-state aluminum-magnesium alloy and the H38-state aluminum-magnesium alloy are listed in Table 1.

TABLE 1

| types of aluminum-magnesium alloy | tensile strength/ MPa | yield strength/ MPa | elongation/ % | surface hardness/ HV |
|---|---|---|---|---|
| O-state aluminum-magnesium alloy | 300~330 | 140~200 | >18 | 70~80 |
| H38-state aluminum-magnesium alloy | 390~430 | 310~350 | >6 | 80~90 |

It can be seen from Table 1 that the mechanical strength and hardness of the H38 aluminum-magnesium alloy are greater than that of the O-state aluminum-magnesium alloy, and the elongation of the O-state aluminum-magnesium alloy is greater than that of the H38-state aluminum-magnesium alloy, so that the first opening 124 of the metal back plate 122 is not prone to cracks, and deformation, warpage, scratches and other appearance defects do not occur during the manufacturing and assembly process of the metal back plate 122.

In some embodiments, the first area 129 and the second area 130 may not be adjacent. In some embodiments, the first area 129 and the second area 130 may also be connected. Exemplarily, a connecting line 101 between the first area 129 and the second area 130 may be suitably determined by those skilled in the art, for example, it may be a straight line, or other regular or irregular structures. Referring to FIG. 3, when the connecting line 101 between the first area 129 and the second area 130 is a straight line, it is convenient to cut and adjust the respective proportions of the first area 129 and the second area 130 in the metal back plate 122. Exemplarily, the ratio of the width W1 of the first area 129 to the width W2 of the second area 130 may be 1:6 to 1:3.

Figure 6:
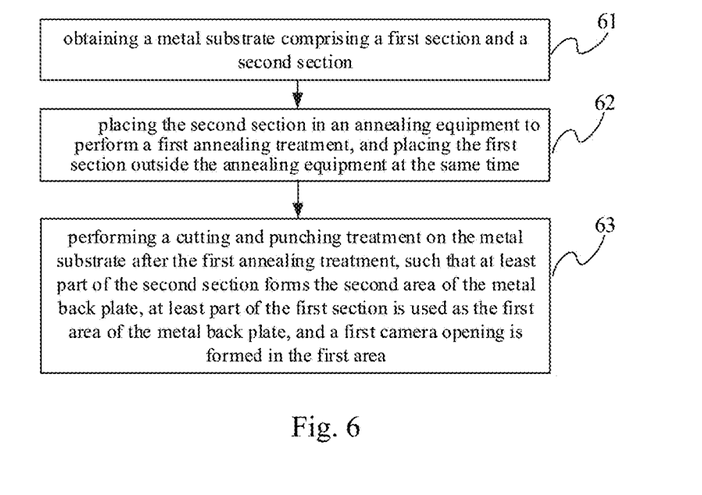
FIG. 6 is a flow chart of a process for manufacturing a metal back plate according to an exemplary embodiment of the present disclosure.
Figure 7:
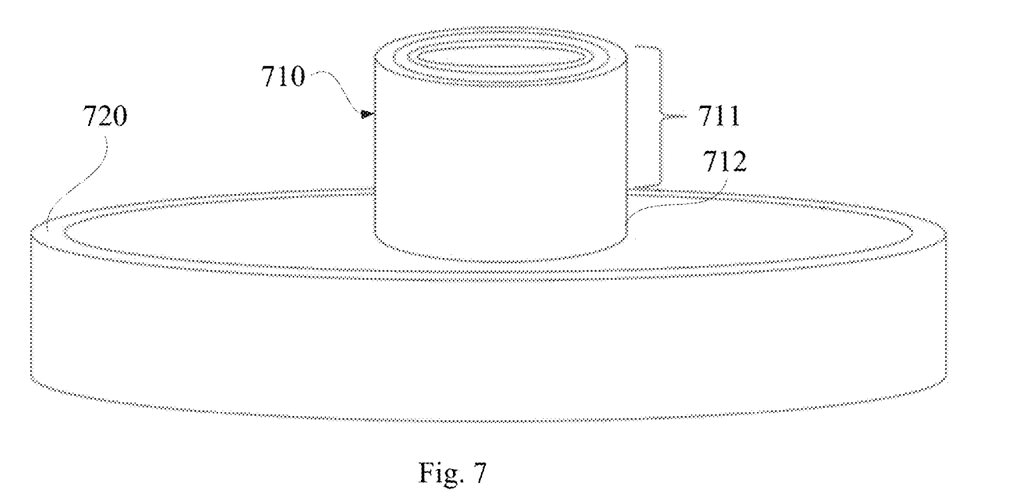
FIG. 7 is a schematic diagram of performing a first annealing treatment on a metal substrate according to an exemplary embodiment of the present disclosure.

FIG. 6 is a flow chart of a process for manufacturing a metal back plate 122 according to an exemplary embodiment of the present disclosure. FIG. 7 is a schematic diagram of performing a first annealing treatment on a metal substrate according to an exemplary embodiment of the present disclosure. Some embodiments of the present disclosure also provide a process for manufacturing the metal back plate 122, which is used to manufacture the metal back plate 122 as described in any of the above embodiments. With reference to FIG. 6 and FIG. 7, the process of manufacturing the metal back plate 122 includes steps 61 to 63 as follows.

In step 61, a metal substrate 710 is obtained. The metal substrate 710 includes a first section 711 and a second section 712. It is noted that the first section 711 and the second section 712 are two parts of the metal substrate 710, respectively. Exemplarily, the first section 711 and the second section 712 are directly connected. Exemplarily, the first section 711 and the second section 712 are indirectly connected.

In some embodiments, the step 61 includes steps 611 and 612.

In step 611, an aluminum-magnesium alloy plate is obtained.

For example, an aluminum part and a magnesium part may be mixed and melted, and then cooled to form the aluminum-magnesium alloy plate. Exemplarily, the thickness of the aluminum-magnesium alloy plate may be 10 mm.

In step 612, a hot rolling treatment, a first cold rolling treatment, a second annealing treatment, a second cold rolling treatment, a third annealing treatment, a third cold rolling treatment, a straightening and trimming treatment and a cleaning treatment are performed sequentially on the aluminum-magnesium alloy plate to obtain the metal substrate 710.

Exemplarily, the temperature of the hot rolling treatment is in a range of 400° C. to 500° C., and the first cold rolling treatment is performed after the hot rolling treatment to avoid problems such as cracking of the aluminum-magnesium alloy plate. Exemplarily, the second annealing treatment may be performed in a continuous furnace, and the temperature of the second annealing treatment may be in a range of 350° C. to 370° C. Performing the second annealing treatment after the first cold rolling treatment may reduce the hardness of the aluminum-magnesium alloy plate, and improve its elongation. After the second cold rolling process, the aluminum-magnesium alloy plate may be wound into a coil. Then, the aluminum-magnesium alloy plate is subjected to a third annealing treatment in a nitrogen atmosphere, and the temperature of the third annealing treatment may be in a range of 380° C. to 450° C. Through the third cold rolling process, the aluminum-magnesium alloy plate may reach a target thickness of the metal back plate 122, such as 0.1 mm. The aluminum-magnesium alloy plate is cut through the straightening and trimming treatment to obtain neat edges, and then cleaned to remove wastes.

In step 62, the second section 712 is placed in annealing equipment 720 to perform a first annealing treatment, and the first section 711 is placed outside the annealing equipment 720 at the same time, referring to FIG. 7. In this way, the second section 712 is subjected to the first annealing treatment, which makes the grain size of the metal material in the second section 712 smaller than the grain size of the metal material in the first section 711, thereby making the hardness and mechanical strength of the second section 712 greater than that of the first section 711, and the elongation of the first section 711 greater than that of the second section 712.

In some embodiments, the annealing equipment 720 includes a salt bath furnace, and the salt bath furnace contains potassium nitrate or molten lead at a temperature between 350° C. and 550° C. The temperature of the potassium nitrate or molten lead may be 350° C., 400° C., 450° C., 500° C. or 550° C. In some embodiments, the first annealing treatment is performed for 2 s to 180 s, for example, 2 s, 10 s, 50 s, 60 s, 80 s, 120 s, 150 s or 180 s. By the cooperation of the temperature and time of the first annealing treatment, the metal material in the second section 712 of the aluminum-magnesium alloy plate may easily form the H38-state aluminum-magnesium alloy. The metal material in the first section 711 without subjected to the first annealing treatment may be the O-state aluminum-magnesium alloy.

Exemplarily, after the first annealing treatment is performed on the second section 712, the aluminum-magnesium alloy plate may be subjected to a natural cooling treatment.

In some embodiments, before the step 63, the process of manufacturing the metal back plate 122 provided by the embodiments of the present disclosure further includes performing a cutting and axial splitting treatment on the metal substrate 710 after the first annealing treatment, so as to facilitate the cutting and punching treatment on the metal substrate with a smaller weight.

In step 63, a cutting and punching treatment is performed on the metal substrate 710 after the first annealing treatment, such that at least part of the second section 712 forms the second area 130 of the metal back plate 122, at least part of the first section 711 is used as the first area 129 of the metal back plate 122, and a first opening 124 is formed in the first area 129 to obtain the metal back plate 122.

Figure 8:
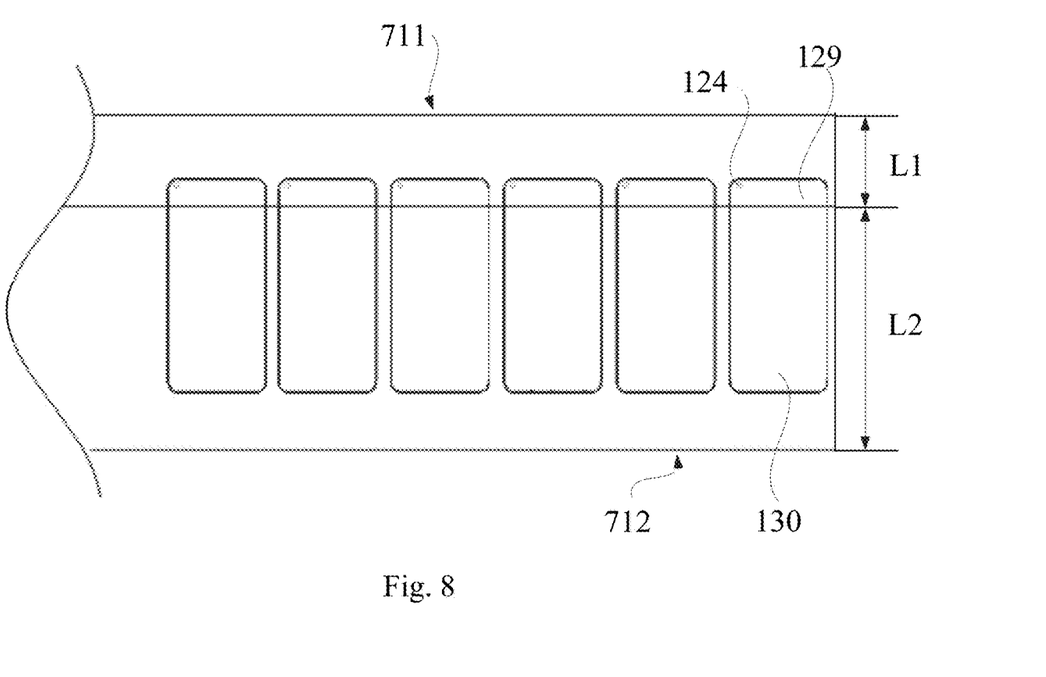
FIG. 8 is a schematic diagram showing the position of the metal back plate on the metal substrate according to an exemplary embodiment of the present disclosure.

FIG. 8 is a schematic diagram showing the position of the metal back plate 122 on the metal substrate 710 according to an exemplary embodiment of the present disclosure. It will be understood that the cutting and punching treatment may be performed according to the position of the metal back plate 122 on the metal substrate 710 as shown in FIG. 8, such that at least part of the second section 712 correspondingly forms the second area 130, and at least part of the first section 711 without subjected to the first annealing treatment is directly used as the first area 129. The first area 129 is punched to form the first opening 124. It should be noted that the sequence of the cutting treatment and the punching treatment is not particularly limited in the present disclosure, which may be suitably selected by the person skilled in the art as required. In this way, the elongation of the first area 129 of the metal back plate 122 is greater than that of the second area 130, and the mechanical strength and hardness of the second area 130 are greater than that of the first area 129. Exemplarily, the width L1 of the first section 711 may be 60 mm, and the width L2 of the second area 130 may be 180 mm.

In summary, in the process of manufacturing the metal back plate 122 provided by the embodiments of the present disclosure, the second section 712 of the metal substrate 710 is placed in the annealing equipment 720 to perform the first annealing treatment, such that at least part of the second section 712 forms the second area 130 of the metal back plate 122 after the cutting and punching treatment. By placing the first section 711 of the metal substrate 710 outside the annealing equipment 720, at least part of the first section 711 is used as the first area 129 of the metal back plate 122 after the cutting and punching treatment. In this way, the grain size of the metal material in the first area 129 is larger than the grain size of the metal material in the second area 130, which makes the elongation of the first area 129 greater than that of the second area 130, thereby making the first opening 124 in the first area 129 not crack, and makes the hardness and mechanical strength of the second area 130 greater than that of the first area 129, thereby making the deformation, warpage, scratches and other appearance defects not occur during the manufacturing and assembly process of the metal back plate 122, which is beneficial to the improvement of the production yield of the metal back plate 122, the backlight module 120 and the electronic device 100.

The embodiments of the present disclosure improve the manufacturing process of the metal back plate 122, so that the proportion of the appearance defects like deformation, warpage and scratches are reduced, and no cracks will happen to the edge of the first opening 124, without increasing the weight of the metal back plate 122 and without changing the position of the first opening 124, which improves the production yield and is beneficial to the reduction the production cost.

For the method embodiments, they substantially correspond to the device embodiments, and thus reference can be made to the description of the device embodiments for the related parts. The method embodiments and the device embodiments are complementary to each other.

The above-mentioned various embodiments of the present disclosure are complementary to each other without causing conflicts.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A metal back plate for a backlight module, comprising:
a first area and a second area, wherein grain size of a first metal material in the first area is larger than a grain size of a second metal material in the second area, and the first area is formed with a first opening that penetrates in a thickness direction of the metal back plate, and the second area has no openings;
wherein both the first metal material in the first area and the second metal material in the second area comprise an aluminum-magnesium alloy.

2. The metal back plate according to claim 1, wherein the aluminum-magnesium alloy in the first area comprises an O-state aluminum-magnesium alloy, and the aluminum-magnesium alloy in the second area comprises an H38-state aluminum-magnesium alloy.

3. The metal back plate according to claim 1, wherein the first area is connected to the second area.

4. The metal back plate according to claim 1, wherein a ratio of a width of the first area to a width of the second area is in a range of 1:6 to 1:3.

5. A process for manufacturing the metal back plate according to claim 1, comprising:
obtaining a metal substrate comprising a first section and a second section;
placing the second section in annealing equipment to perform a first annealing treatment, while the first section remains outside the annealing equipment; and
performing a cutting and punching treatment on the metal substrate after the first annealing treatment, such that at least part of the second section forms the second area of the metal back plate, at least part of the first section is used as the first area of the metal back plate, and a first opening is formed in the first area to obtain the metal back plate.

6. The process according to claim 5, wherein the annealing equipment comprises a salt bath furnace containing potassium nitrate or molten lead at a temperature between 350° C. and 550° C.

7. The process according to claim 5, wherein the first annealing treatment is performed for 2 s to 180 s.

8. The process according to claim 5, wherein obtaining the metal substrate comprises:
obtaining an aluminum-magnesium alloy plate; and
performing a hot rolling treatment, a first cold rolling treatment, a second annealing treatment, a second cold rolling treatment, a third annealing treatment, a third cold rolling treatment, a straightening and trimming treatment and a cleaning treatment sequentially on the aluminum-magnesium alloy plate to obtain the metal substrate.

9. The process according to claim 8, wherein the hot rolling treatment is performed at a temperature of 400° C. to 500° C.

10. The process according to claim 8, wherein the second annealing treatment is performed at a temperature of 350° C. to 370° C.

11. The process according to claim 8, wherein the third annealing treatment is performed at a temperature of 380° C. to 450° C.

12. A backlight module, comprising:
a backlight layer comprising a light-emitting surface and a back surface opposite to the light-emitting surface, wherein the backlight layer is formed with a second opening; and
the metal back plate according to claim 1, arranged on a back side of the backlight layer, wherein the first opening and the second opening are coaxial.

13. The backlight module according to claim 12, wherein an aperture size of the first opening is smaller than that of the second opening.

14. The backlight module according to claim 12, wherein an aperture size of the first opening is equal to that of the second opening.

15. The backlight module according to claim 12, wherein the first opening is sleeved in the second opening.

16. An electronic device, comprising:
a display layer comprising a display surface and a back surface opposite to the display surface;
the backlight module according to claim 12 disposed on the back surface of the display layer, wherein the light-emitting surface of the backlight layer in the backlight module faces the back surface of the display layer; and
a camera module arranged on a side of the backlight module away from the display layer, wherein the camera module is opposite to the first opening of the metal back plate.

17. The electronic device according to claim 16, wherein at least part of the camera module extends into the first opening.

18. The electronic device according to claim 16, wherein the camera module is a front camera module.

* * * * *